United States Patent
Bunout

(10) Patent No.: US 12,013,034 B2
(45) Date of Patent: Jun. 18, 2024

(54) PARK LOCK ACTUATION SYSTEM AND METHOD FOR OPERATING A PARK LOCK ACTUATION SYSTEM

(71) Applicant: Schaeffler Technologies AG & Co. KG, Herzogenaurach (DE)

(72) Inventor: Felix Bunout, Karlsruhe (DE)

(73) Assignee: Schaeffler Technologies AG & CO. KG, Herzogenaurach (DE)

(*) Notice: Subject to any disclaimer, the term of this patent is extended or adjusted under 35 U.S.C. 154(b) by 0 days.

(21) Appl. No.: 18/026,832

(22) PCT Filed: Sep. 20, 2021

(86) PCT No.: PCT/DE2021/100767
§ 371 (c)(1),
(2) Date: Mar. 17, 2023

(87) PCT Pub. No.: WO2022/073542
PCT Pub. Date: Apr. 14, 2022

(65) Prior Publication Data
US 2023/0332685 A1    Oct. 19, 2023

(30) Foreign Application Priority Data
Oct. 9, 2020 (DE) ............ 10 2020 126 523.9

(51) Int. Cl.
*F16H 63/34* (2006.01)
(52) U.S. Cl.
CPC ..... *F16H 63/3483* (2013.01); *F16H 63/3433* (2013.01)

(58) Field of Classification Search
CPC ............ F16H 63/3483; F16H 63/3433; F16H 63/3491; F16D 2129/02; F16D 2125/20; F16D 2125/02
See application file for complete search history.

(56) References Cited

U.S. PATENT DOCUMENTS

| | | | |
|---|---|---|---|
| 8,667,859 B2* | 3/2014 | Engel ............... | F16H 61/30 74/473.11 |
| 2018/0056958 A1* | 3/2018 | Möhlmann ............ | B60T 1/062 |

(Continued)

FOREIGN PATENT DOCUMENTS

| | | |
|---|---|---|
| DE | 102012016235 A1 | 2/2014 |
| DE | 102014018123 A1 | 6/2016 |

(Continued)

OTHER PUBLICATIONS

Machine translation of WO 2019197742 A1. (Year: 2019).*

*Primary Examiner* — Jacob S. Scott
*Assistant Examiner* — Farhana Pervin

(57) ABSTRACT

A park lock actuation system for a motor vehicle includes an actuating element and a blocking element. The actuating element is translatable by hydraulic actuation from a locking position, in which a park lock coupled with the actuating element is active, to an unlocking position, in which the park lock is inactive, when a first hydraulic pressure value is exceeded. The blocking element is formed as a transverse slide and is movable, by hydraulic actuation, from an unblocking position, in which the actuating element is translatable between the locking position and the unlocking position, to a blocking position, in which the blocking element fixes the actuating element in the unlocking position in a form-fitting manner, when a second pressure value, higher than the first hydraulic pressure value, is exceeded.

16 Claims, 3 Drawing Sheets

(56) References Cited

U.S. PATENT DOCUMENTS

| | | | |
|---|---|---|---|
| 2019/0145511 A1* | 5/2019 | Novak | F16H 63/483 |
| | | | 192/219.4 |
| 2019/0271395 A1* | 9/2019 | Schwegler | F16H 63/3433 |
| 2020/0096102 A1* | 3/2020 | Kasami | F16H 63/3475 |
| 2022/0235862 A1* | 7/2022 | Rolser | F16H 63/3483 |
| 2023/0097586 A1* | 3/2023 | Van Druten | F16H 63/3483 |
| | | | 192/219.4 |

FOREIGN PATENT DOCUMENTS

| | | | |
|---|---|---|---|
| DE | 102016000476 A1 | 9/2016 | |
| DE | 102015214037 A1 | 1/2017 | |
| DE | 102017102804 A1 | 8/2018 | |
| FR | 3063323 A1 | 8/2018 | |
| FR | 3063324 A1 | 8/2018 | |
| WO | WO-2016087018 A2 * | 6/2016 | ......... F16H 63/3483 |
| WO | 2019197742 A1 | 10/2019 | |
| WO | 2022028641 A1 | 2/2022 | |

* cited by examiner

PARK LOCK ACTUATION SYSTEM AND METHOD FOR OPERATING A PARK LOCK ACTUATION SYSTEM

CROSS-REFERENCE TO RELATED APPLICATIONS

This application is the United States National Phase of PCT Appln. No. PCT/DE2021/100767 filed Sep. 20, 2021, which claims priority to German Application No. DE102020126523.9 filed Oct. 9, 2020, the entire disclosures of which are incorporated by reference herein.

TECHNICAL FIELD

The present disclosure relates to a park lock actuation system for a motor vehicle, e.g., a hybrid or purely electric motor vehicle. The present disclosure also relates to a method for operating a park lock actuation system.

BACKGROUND

Park lock actuation systems are already sufficiently known in the prior art. For example, DE 10 2017 102 804 A1 discloses a device for actuating a park lock. However, such park lock actuation systems have disadvantages in terms of their complexity and their functionality. In particular, there is a dependence of the park lock actuation systems on the state of charge of the vehicle electrical system or on the state of the hydraulic system.

SUMMARY

The present disclosure provides a park lock actuation system and a method for operating a park lock actuation system that is compact and simple in design and can optionally fulfill a transporting of the motor vehicle or a normally-P function independently of the charging state of a vehicle electrical system and a hydraulic system.

The park lock actuation system has an actuation element that can be or is coupled to a park lock and that can be embodied, for example, as a plunger, pin or the like. The actuating element can be displaced between a locking position in which the park lock is active, i.e., an output component of the motor vehicle is locking against rotation, and an unlocking position in which the park lock is inactive, i.e., the output component of the motor vehicle is released for rotation. For example, the actuating element can be displaced along its longitudinal axis. The actuating element can be moved from its locking position into its unlocking position in a hydraulically actuated manner when a predetermined first pressure value is exceeded. For example, the actuating element can be displaced into its unlocking position by the restoring force of a (first) spring element. This means that the restoring force presses the actuating cylinder into its locking position in order to implement a normally-P function in normal driving operation. In other words, the actuating element is operatively connected/coupled to a (single-acting) hydraulic actuating cylinder and can be displaced thereby when the predetermined first pressure value is exceeded (by the restoring force of the first restoring element into its unlocking position).

The park lock actuation system also has a blocking element. The blocking element can be displaced between a blocking position and an unblocking position. In the blocking position, the blocking element fixes the actuating element, e.g., in a form-fitting manner, in its unlocking position, so that the actuating element cannot be moved/returned (back) into its unlocking position. In the unlocking position, the locking of the actuating element is inactive, so that the actuating element can be moved between its locking position and its unlocking position. The blocking element can be moved from its unblocking position into its blocking position in a hydraulically actuated manner when a predetermined second pressure value is exceeded. For example, the blocking element can be displaced into its blocking position by the restoring force of a (second) spring element. In other words, the actuating element is operatively connected/coupled to a (single-acting) hydraulic blocking cylinder and can be displaced thereby when the predetermined second pressure value is exceeded (by the restoring force of the second restoring element into its blocking position). Here, the second pressure value is higher than the first pressure value.

According to the present disclosure, the blocking element is designed as a transverse slide that can be displaced radially/transversely to a longitudinal axis of the actuating element, e.g., as a plurality of transverse slides arranged to be distributed over the circumference of the park lock actuation system. For example, the transverse slide is shifted/deflected radially outward in the blocking position. For example, in the blocking position, the transverse slide can engage in a groove in the actuating element or in the actuating cylinder in order to prevent the actuating element from moving back into its locking position in a form-fitting manner. In this way, the park lock can be kept unlocked by the blocking element in its blocking position in order to implement a transport function. In the following, the transverse slide is used synonymously for the blocking element.

In other words, the actuating element and the locking element are each operatively connected to a hydraulic cylinder, and the pressure chambers of the two hydraulic actuating cylinders are also connected to a common hydraulic line and are matched to one another in such a way that the actuating element is displaced from a lower pressure value present in the hydraulic line and the actuating element is displaced from a higher pressure value present in the hydraulic line, which is higher than the lower pressure value. Such a coupling of the two actuating cylinders that control the actuating element and the blocking element enables hydraulic control of the park lock that is as simply structured as possible and is also direct. In addition, a transport state of the motor vehicle can be reliably switched with simple means, so that the park lock can be unlocked/kept inactive when de-energized (and depressurized), e.g., by the hydraulically actuated and mechanically blocking blocking element. As a result, all other operating states of the park lock actuation system can also be controlled easily.

Accordingly, the park lock actuation system can have the first restoring element, by the restoring force of which the actuating element can be displaced in the longitudinal direction (into its unlocking position), and the second restoring element, by the restoring force of which the blocking element can be displaced/deflected in the radial direction, for example outwards (into its blocking position). According to an example embodiment, the first restoring element and the second restoring element can be matched to one another in such a way that an (axial) force caused by the first restoring element and acting on the actuating element causes a frictional force acting in the blocking position between the actuating element and the blocking element that is greater than the restoring force of the second restoring element. This means that the blocking element in its blocking position prevents the actuating element from moving back in a form-fitting manner, and the actuating element in turn, when it rests against the blocking element due to the form-fitting fit, prevents the blocking element from moving back out of its blocking position with a friction fit. In this way, the blocking element can be held in its blocking position without current or pressure.

According to an example embodiment, the actuating cylinder and the blocking cylinder can be matched to one another in such a way that the blocking element is held in its blocking position when the pressure is reduced starting from the second pressure value until the frictional force acts on the blocking element. The hydraulic blocking cylinder can have a longitudinally displaceable auxiliary piston. The hydraulic actuating cylinder can have a longitudinally displaceable main piston. This causes the main piston and the auxiliary piston to move back when the pressure is relieved, but the auxiliary piston moves back so slowly that it holds the transverse slide in its deflected position until the transverse slide continues to be held in its deflected position by the frictional force. This ensures reliable functioning of the park lock actuation system.

According to a further development of the embodiment, the blocking cylinder and the actuating cylinder can be actuated via a common hydraulic supply. For example, a volume flow of the hydraulic supply into (and out of) the blocking cylinder can be lower than that into (and out of) the actuating cylinder. This ensures that the auxiliary piston retracts more slowly.

According to an example development of the embodiment, the blocking cylinder for hydraulic supply can be connected to the actuating cylinder via an orifice. The flow rate is reduced by the orifice and the retraction of the auxiliary piston is slowed down.

According to an example embodiment, the radial displacement/radial deflection of the blocking element can be coupled with the longitudinal displacement of the auxiliary piston. This means that the longitudinal displacement causes the radial displacement, e.g., radially outward, of the blocking element from its unblocking position into its blocking position.

According to a further development of the example embodiment, the blocking element and the auxiliary piston can have corresponding surfaces which interact with one another in such a way that the blocking element is displaced in the radial direction (of the park lock actuation system), e.g., outward, when the piston is displaced longitudinally. For example, a ramp/inclined surface that generates these kinematics can be provided on the blocking element and/or the auxiliary piston.

According to a development of the example embodiment, the park lock actuation system can have a third restoring element, by the restoring force of which the auxiliary piston can be displaced in the longitudinal direction for deflecting the blocking element. This means that the restoring force of the auxiliary piston and the transverse slide is realized by separate restoring elements, so that two different restoring forces can be realized. Thus, the restoring movement of the transverse slide is separated from that of the auxiliary piston.

According to a further development of the example embodiment, the auxiliary piston can be designed as an annular piston arranged axially (and/or radially) inside the main piston. This means that the auxiliary piston is integrated into the installation space of the main piston. A compact design is achieved in this way.

According to an example embodiment, the longitudinal displacement of the actuating element into its unblocking position can be directly coupled to the longitudinal displacement/longitudinal deflection of the main piston. This means that the longitudinal displacement of the main piston causes the longitudinal displacement of the actuating element from its locking position to its unlocking position.

For easy controllability of the actuating element, it is also expedient if the park lock actuation system has an electrically operated holding magnet holding the actuating element in its unlocking position. In normal driving operation, the park lock can be kept open without pressure by energizing the holding magnet.

The present disclosure also relates to a method of operating a park lock actuation system for a motor vehicle. Thus, the park lock actuation system is operated in a driving mode by applying pressure below a predetermined (second) pressure value, and the park lock actuation system is switched from the driving mode to a transport mode by applying pressure above the predetermined (second) pressure value. The park lock actuation system may be switched from the transport mode to the driving mode by pressurizing below the predetermined (second) pressure level and above a lower (first) pressure level that is less than the predetermined (second) pressure level. In the driving mode, the depressurized and de-energized park lock actuation system activates a park lock. In the transport mode, the depressurized and de-energized park lock actuation system keeps the park lock unlocked.

In other words, the present disclosure relates to a hydraulic park lock actuation system in which a normally-P functionality (a driving mode) is fulfilled, i.e., the park lock is automatically activated in the event of a power failure, in which a transport mode is realized in which the park lock/park lock mechanism can be kept deactivated independently of the power supply and the hydraulic supply i.e., for example, it can be de-energized and depressurized, and which can be adjusted via a simple control valve.

In summary, the park lock actuation system for hydraulically actuating a park lock is designed in such a way that this actuation is designed to be "normally closed" so that the park lock is automatically locked in the event of a power failure. It is actuated by a hydraulic piston (main piston), a plunger (actuating element), a (first) restoring spring, an electric magnet (holding magnet), and a travel sensor. While driving (in normal driving operation/driving mode), the piston is held in place by the electric magnet (unlocking position), so that the park lock is unblocked. In the event of a power failure, the restoring spring pushes the piston with the plunger into its parking position (locking position), so that the park lock is blocked. In order to be able to keep the park lock unblocked for a longer period without current (transport mode), a mechanical holder (blocking element/transverse slide) of the plunger/piston is provided.

It should be possible for hydraulic actuation to activate and deactivate the mechanism. For this purpose, an auxiliary piston is integrated into the piston (main piston), which begins to move at a higher pressure level than the main piston. This displacement can therefore only take place when the main piston is in its stop/is fully extended after the park lock has been actuated (unlocking position). The activation pressure of the auxiliary piston is realized by a spring biasing (third restoring element). The restoring force from the auxiliary piston and from the transverse slide are realized by separate spring elements (second and third restoring element) and their restoring movement is separated. The restoring force of the transverse slide is designed to be sufficient to move it back (radially inwards). The displacement of the auxiliary piston produces a displacement of one or more transverse slides in the radial direction to the piston or plunger axis (longitudinal axis), for example by a ramp on the transverse slide. The radially (outwardly) shifted transverse slide engages in a groove located in the park lock cylinder (actuating cylinder or other stationary component). When the pressure is released both pistons start to move back. In order for the transverse slide to remain in the groove, the auxiliary piston must move back slowly enough, which is controlled by an orifice arranged between the auxiliary cylinder (blocking cylinder) and the main cylinder (actuating cylinder). When the transverse slide is in the groove, the piston is prevented from fully retracting and is held in position with no pressure or power.

In the transport mode, the transverse slide is axially loaded by the force of the (first) restoring element of the main piston and the frictional force thus generated between the transverse slide and the main piston or groove is greater than the restoring force of the transverse slide. In normal driving operation (driving mode), the park lock is actuated at a low pressure level (below the second pressure value), so that the auxiliary piston does not move. To activate the transport mode, the pressure is increased to the second pressure value. In order to deactivate the transport mode again, the pressure is brought to the low pressure level (between the first and second pressure value), so that the main piston moves and the transverse slide is relieved (due to the removed frictional force) and moves back. Thereafter, the pressure is reduced (below the first pressure value) and the main piston moves back to the park (locked) position.

BRIEF DESCRIPTION OF THE DRAWINGS

The present disclosure is explained below with the aid of drawings. In the figures.

DETAILED DESCRIPTION

The figures are only schematic in nature and serve only for understanding the disclosure. The same elements are provided with the same reference symbols. The features of the individual embodiments can be interchanged.

Figure 1:
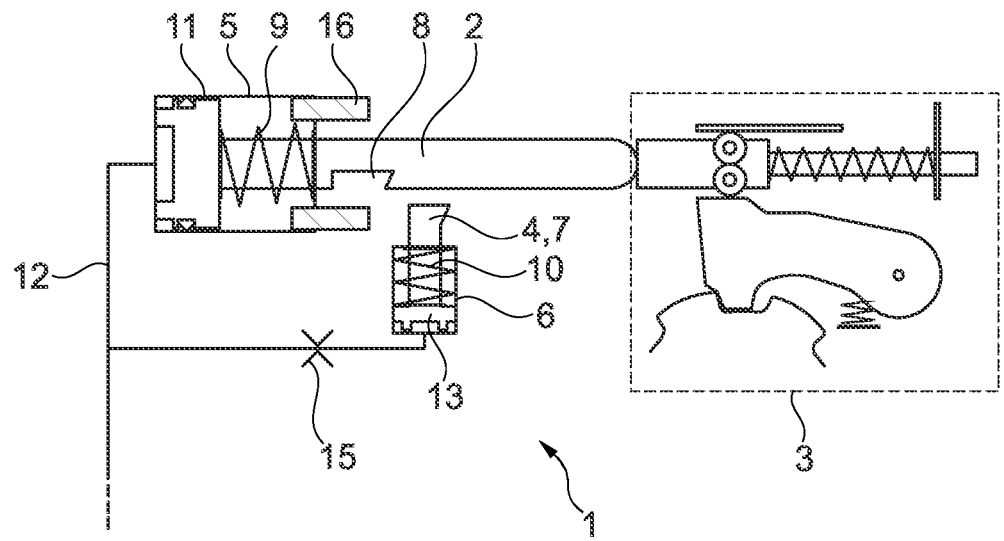
FIG. 1 shows a schematic representation of a park lock actuation system.

FIG. 1 shows a schematic representation of a park lock actuation system 1 for a motor vehicle, on the basis of which an operating mode of the park lock actuation system 1 is described. The park lock actuation system 1 has an actuation element 2 which can be used directly to (mechanically) adjust a park lock 3. The actuating element 2 can be or is coupled to the park lock 3. The actuating element 2 can be displaced, for example, along its longitudinal axis between a locking position shown in FIG. 1 and an unlocking position. In the locking position, the park lock 3 is active. In the unlocking position, the park lock 3 is inactive.

The park lock actuation system 1 has a blocking element 4. The blocking element 4 can be displaced between a blocking position and an unblocking position. In the blocking position, the blocking element 4 fixes the actuating element 2 in a positive manner in its unlocking position. In other words, the blocking of the actuating element 2 is active, so that the actuating element 2 cannot be moved (back) into its unlocking position. In the unblocking position, the blocking of the actuating element 2 is inactive/not active, so that the actuating element 2 can be moved between its locking position and its unlocking position.

The actuating element 2 is operatively connected/coupled to a (single-acting) hydraulic actuating cylinder 5 and can be displaced by this when a predetermined first pressure value p1 is exceeded. This means that the actuating element 2 can be moved in a hydraulically actuated manner from its locking position, in which the park lock 3 is active, into its unlocking position, in which the park lock 3 is inactive, by exceeding the predetermined first pressure value p1.

The blocking element 4 is operatively connected/coupled to a hydraulic blocking cylinder 6 and can be displaced by this when a predetermined second pressure value p2 is exceeded. This means that the blocking element 4 moves from its unblocking position, in which the actuating element 2 can be moved between its locking position and its unlocking position, into its blocking position, in which the blocking element 4 fixes the actuating element 2 in its unlocking position, preferably in a form-fitting manner, can be moved in a hydraulically actuated manner by exceeding the predetermined second pressure value p2. The second pressure value p2 is higher than the first pressure value p1.

In the park lock actuation system 1, the blocking element 4 is designed as a transverse slide 7 that can be displaced radially with respect to a longitudinal axis of the actuation element 2. In particular, the transverse slide 7 is shifted/deflected radially outwards in the blocking position. For example, in the blocking position, the transverse slide 7 can engage in a groove 8 in the actuating element 2 or in the actuating cylinder 5 in order to prevent the actuating element 2 from moving back into its locking position in a form-fitting manner.

The actuating element 2 can be displaced in the longitudinal direction (of the park lock actuation system 1 or of the actuating element 2) counter to the restoring force of a first restoring element 9. For example, the actuating element 2 may be biased by the restoring force/release force/spring force of the first restoring element 9, e.g., a spring, into its locking position. The blocking element 4 can be displaced in the radial direction (of the park lock actuation system 1 or of the actuation element 2) counter to the restoring force of a second restoring element 10. For example, the blocking element 4 may be biased by the restoring force/release force/spring force of the second restoring element 10, e.g., a spring, into its unlocking position.

The first restoring element 9 and the second restoring element 10 can be matched to one another in such a way that a force caused by the first restoring element and acting on the actuating element 2 causes a frictional force acting in the blocking position between the actuating element 2 and the blocking element 4 that is greater than the restoring force of the second restoring element 10. As a result, the actuating element 2 holds the blocking element 4 in its blocking position with a friction fit, and the blocking element 4 holds the actuating element 2 in a form-fitting manner in its unlocking position.

The longitudinal displacement of the actuating element 2 may be coupled to a longitudinal displacement of a main piston 11 of the actuating cylinder 5. The main piston 11 may be connected directly to the actuating element 2. For example, when pressure is applied to a pressure chamber of the actuating cylinder 5, the main piston may be axially displaced, so that the actuating element 2 extends into its unlocking position and, when the pressure in the pressure chamber is relieved, the main piston may be displaced axially (back by the restoring force of the first restoring element 9) so that the actuating element 2 moves back into its locking position. The actuating cylinder 5 is connected to a hydraulic line/hydraulic supply 12 for supplying and/or discharging hydraulic fluid/hydraulic medium.

Figure 2:
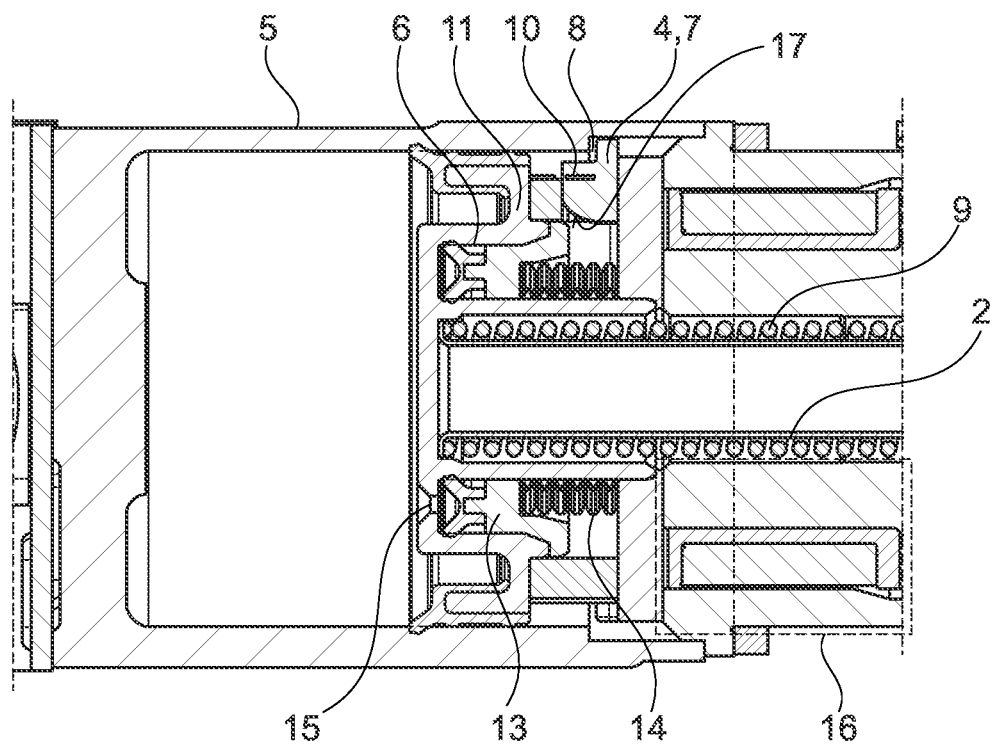
FIGS. 2 to 5 show different representations of the park lock actuation system.
Figure 3:
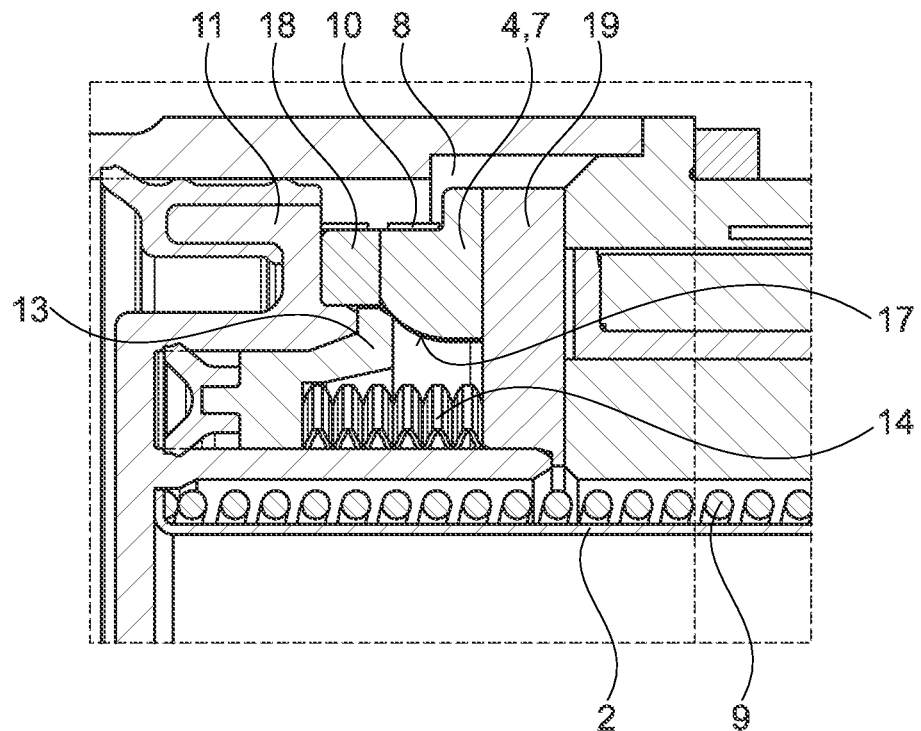
Figure 4:
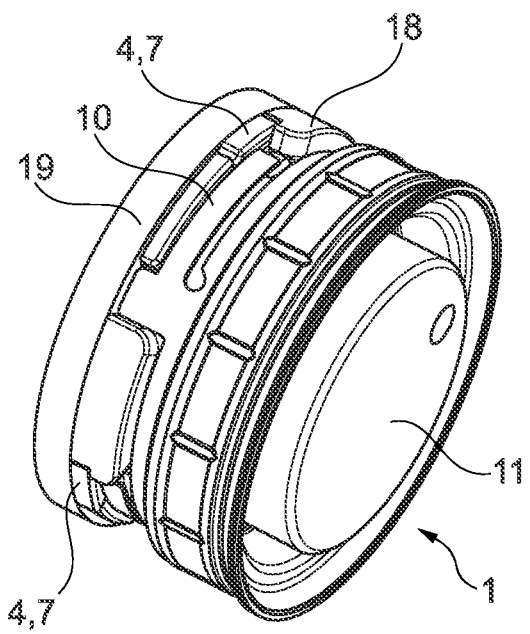
Figure 5:
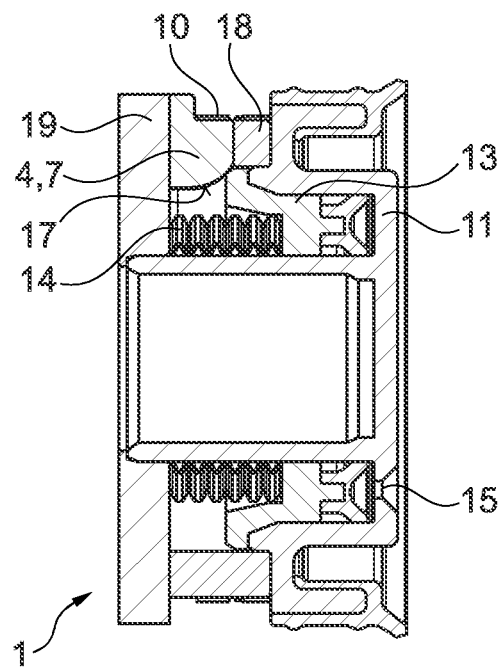

The radial displacement/radial deflection of the blocking element 4 may be coupled with a longitudinal displacement of an auxiliary piston 13 of the blocking cylinder 6. This means that the blocking element 4 can be displaced into its blocking position by the longitudinal displacement of the auxiliary piston 13 by the restoring force of the second restoring element 10. For example, when pressure is applied to a pressure chamber of the blocking cylinder 6, the auxiliary piston may be axially displaced, so that the blocking element 4/the transverse slide 7 extends radially outward into its blocking position, and when the pressure in the pressure chamber is relieved, the auxiliary piston may be axially displaced back by the restoring force of the third restoring element 14 (ref. FIG. 2), so that the blocking element 4/the transverse slide 7 moves back radially inwards into its unlocked position by the restoring force of the second restoring element 10. The blocking cylinder 6 is connected to the hydraulic line/hydraulic supply 12 for supplying and/or discharging hydraulic fluid/hydraulic medium.

A hydraulic orifice 15 can be arranged in a section of the hydraulic line 12 through which hydraulic fluid can be guided into and/or out of the blocking cylinder 6. This means that a flow cross-section or a volume flow of the hydraulic supply of the blocking cylinder 6 is smaller than a flow cross-section or a volume flow of the hydraulic supply of the actuating cylinder 6. The hydraulic fluid thus flows faster into and/or out of the hydraulic cylinder 5 than into and/or out of the blocking cylinder 6. The auxiliary piston 13 is therefore retracted more slowly.

In addition, the park lock actuation system 1 may have a holding magnet 16, by energizing which the actuating element 2 can be held in its unlocking position (during normal driving operation of the motor vehicle).

FIGS. 2 to 5 show different representations of the park lock actuation system 1, on the basis of which a structural configuration is described.

The actuating cylinder 5 forms a park lock cylinder within which the hydraulic and mechanical actuation of the park lock actuation system 1 is arranged. By pressurizing the pressure chamber of the actuating cylinder 5, the main piston 11 is deflected axially (displaced relative to an inner wall of the actuating cylinder 5). The main piston 11 is axially biased by the first restoring spring 9. The first restoring spring 9 is arranged radially between the actuating element 2 and the auxiliary piston 11 and/or the blocking element 4/transverse slide 7. The holding magnet 16 serves as an axial stop for the deflection of the main piston 11.

The blocking cylinder 6 is formed by the main piston 11. The auxiliary piston 13 is designed as an annular piston that is integrated axially and/or radially inside the main piston 11. When the main piston 11 is deflected axially, the auxiliary piston 13 is also deflected. By pressurizing the pressure chamber of the blocking cylinder 6, the auxiliary piston 13 is deflected axially (displaced relative to an inner wall of the blocking cylinder 6 or to the main piston 11). The pressure chamber of the blocking cylinder 6 is connected to the pressure chamber of the actuating cylinder 5 via the orifice 15. The auxiliary piston 13 is axially biased by the third restoring spring 14. The third restoring spring 14 is arranged radially between the actuating element 2 or the first restoring spring 9 and the blocking element 4/transverse slide 7. The third restoring spring 14 is clamped axially between the auxiliary piston 13 and a component which is firmly connected to the actuating element 2 or the main piston 11.

The auxiliary piston 13 is pressed axially against the transverse slide 7 as a result of the axial deflection. The transverse slide 7 has a ramp/inclined surface 17 so that the transverse slide is pressed/displaced/deflected radially outwards by the axial deflection of the auxiliary piston 13 by the restoring force of the second restoring element 10, here a spring ring. In the deflected position, which corresponds to a blocking position of the transverse slide 7, the transverse slide 7 engages in the groove 8 formed in the inner wall of the actuating cylinder 5. The radial displacement of the transverse slide 7 is guided by a sliding sleeve 18. If the transverse slide 7 is in the deflected position, i.e., if the blocking element 4 is in the blocking position, the transverse slide 7 forms a spacer for the actuating element 2 or a component connected thereto. In the illustrated embodiment, a contact plate 19 firmly connected to the main piston 11 rests against the transverse slide 7 and presses it axially against an inner wall of the groove 8 by the restoring force of the first restoring spring 9. This axial force of the contact plate 19 causes the frictional force that is greater than the restoring force of the second restoring element 10 and thus prevents the transverse slide 7 from moving back. If the transverse slide 7 is not deflected, the main piston 11 and thus the actuating element 2 can move back into its locking position.

Figure 6:
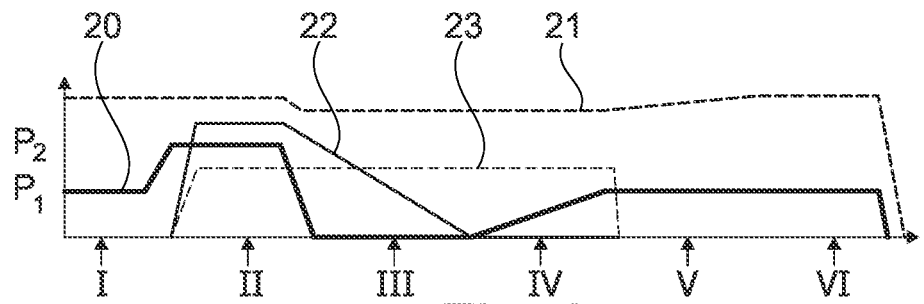
FIG. 6 shows a relationship between a pressure in the park lock actuation system and a position of the park lock actuation system.
Figure 7A:
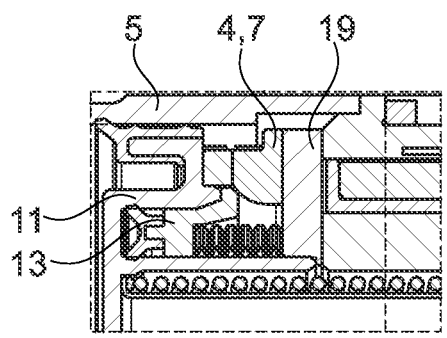
FIGS. 7A to 7F show an associated longitudinal sectional representation of the park lock actuation system at selected positions from FIG. 6.
Figure 7B:
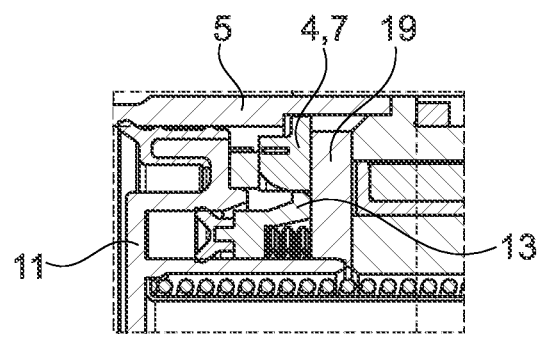
Figure 7C:
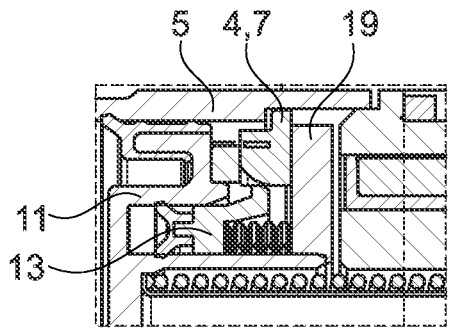
Figure 7D:
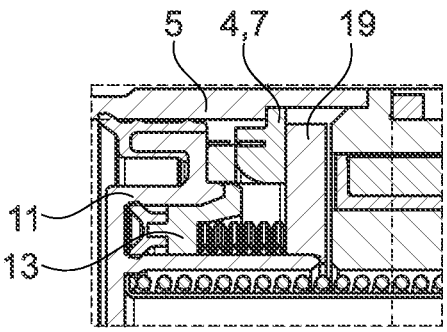
Figure 7E:
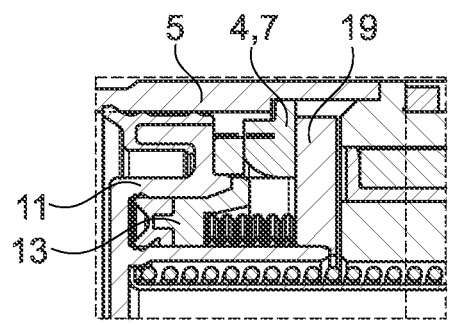
Figure 7F:
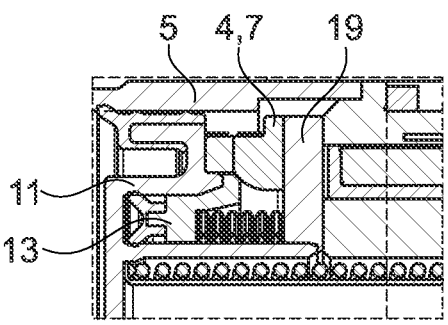

FIG. 6 shows a graph in which the relationship between a hydraulic pressure 20 present in the hydraulic line 12, an actuating element deflection 21, an auxiliary piston deflection 22 and a blocking element deflection 23 are plotted. FIGS. 7A to 7F show associated positions at different points in time I to VI from FIG. 6 of the park lock actuation system 1 in longitudinal section. The positions are described in more detail below.

At the time I (see FIG. 7A), the hydraulic pressure corresponds to the first pressure value p1. The main piston 11 is fully deflected axially and the actuating element 2 is held in its unlocking position. By energizing the holding magnet 16, the actuating element 2 (for normal driving) can be held in this unlocked position without pressure. The pressure is lower than the second pressure value p2, so that the auxiliary piston 13 and the transverse slide 7 are not deflected. The blocking element 4 is in its unblocking position.

The auxiliary piston 13 is activated between the times I and II. For this purpose, the hydraulic pressure is increased up to the second pressure value p2. The auxiliary piston 13 is deflected axially until it rests against the contact plate 19. Due to the axial deflection of the auxiliary piston 13, the transverse slide 7 is deflected radially until it engages in the groove 8.

At the time II (see FIG. 7B), the hydraulic pressure corresponds to the second pressure value p2. The main piston 11 remains fully deflected axially and the actuating element 2 is held in its unlocking position. The auxiliary piston 13 is kept deflected by the hydraulic pressure. The transverse slide 7 is held deflected by the auxiliary piston 13 in its locking position. A transport mode is activated/engaged.

The hydraulic pressure is lowered between the times II and III. The main piston 11 and the actuating element 2 move back axially until they (or the contact plate 19) rest against the transverse slide 7/are prevented from moving back further in a form-fitting manner. The auxiliary piston 13 moves back axially, but more slowly than the main piston 11, so that the transverse slide 7 is kept deflected by the auxiliary piston 13 until the main piston 11 (or the contact plate 19) rests against the transverse slide 7. The actuating element 2 is in its unlocking position. The blocking element 4 is in its blocking position.

At the time III (see FIG. 7C), the hydraulic pressure is lower than the first pressure value p1. The main piston 11 (or the contact plate 19) bears axially against the transverse slide 7 and is positively prevented from moving back into the locking position of the actuating element 2. The auxiliary piston 13 continues to move back axially and no longer pushes the transverse slide 7 outward. The transverse slide 7 is held radially deflected by the frictional force which is generated on the transverse slide 7 by the restoring force acting axially on the main piston 11 or the actuating element. The actuating element 2 is in its unlocking position. The blocking element 4 is in its blocking position.

At the time IV (see FIG. 7D), the hydraulic pressure is increased. The hydraulic pressure is lower than the first pressure value p1. The auxiliary piston 13 is fully retracted. The actuating element 2 is in its unlocking position. The blocking element 4 is in its blocking position.

At the time V (see FIG. 7E), the hydraulic pressure corresponds to the first pressure value p1. The main piston 11 begins to be deflected axially and the contact plate 19 begins to detach axially from the transverse slide 7.

At the time VI (see FIG. 7F), the hydraulic pressure corresponds to the first pressure value p1. The main piston 11 is fully extended axially. The contact plate 19 is no longer in contact with the transverse slide 7 or no longer presses it axially into the groove 8. The transverse slide 7 is retracted radially by the second restoring element 10 since no frictional force is acting on it. The transport mode is deactivated/disabled. When the hydraulic pressure falls below the first pressure value p1, the main piston 11 would move back into its fully retracted position and the actuating element 2 would move into its blocking position.

REFERENCE NUMERALS

1 Park lock actuation system
2 Actuating element
3 Park lock
4 Blocking element
5 Actuating cylinder
6 Blocking cylinder
7 Transverse slide
8 Groove
9 First restoring element
10 Second restoring element
11 Main piston
12 Hydraulic line
13 Auxiliary piston
14 Third restoring element
15 Orifice
16 Holding magnet
17 Ramp
18 Sliding sleeve
19 Contact plate
20 Hydraulic pressure
21 Actuating element deflection
22 Auxiliary piston deflection
23 Blocking element deflection

The invention claimed is:

1. A park lock actuation system for a motor vehicle, having an actuating element, which can be coupled to a park lock and can be translated, by hydraulic actuation, from its locking position, in which the park lock is active, to its unlocking position, in which the park lock is inactive, as a result of a predefined first pressure value (p1) being exceeded, and having a blocking element, which can be moved, by hydraulic actuation, from its unblocking position, in which the actuating element can be moved between its locking position and its unlocking position, to its blocking position, in which the blocking element fixes the actuating element in its unlocking position in a form-fitting manner, as a result of a predefined second pressure value (p2) being exceeded, wherein the predefined second pressure value (p2) is higher than the predefined first pressure value (p1), wherein the blocking element is in the form of a transverse slide which can be moved radially with respect to a longitudinal axis of the actuating element, wherein the actuating element is connected for actuation thereof to a hydraulic actuating cylinder and the blocking element is connected for the actuation thereof to a hydraulic blocking cylinder, wherein the hydraulic blocking cylinder and the hydraulic actuating cylinder can be actuated via a common hydraulic supply, wherein the hydraulic blocking cylinder is connected to the hydraulic actuating cylinder via an orifice.

2. The park lock actuation system according to claim 1, wherein a first restoring element, by a restoring force of which the actuating element can be translated in a longitudinal direction, and a second restoring element, by a restoring force of which the blocking element can be moved in a radial direction, wherein the first restoring element and the second restoring element are matched to one another in such a way that a force caused by the first restoring element and acting on the actuating element causes a frictional force which acts in its blocking position between the actuating element and the blocking element and which is greater than the restoring force of the second restoring element.

3. The park lock actuation system according to claim 2, wherein the hydraulic actuating cylinder and the hydraulic blocking cylinder are matched in such a way that the blocking element is held in its blocking position when pressure is reduced, starting from the predefined second pressure value, until the frictional force acts on the blocking element.

4. The park lock actuation system according to claim 3, wherein a volume flow of the common hydraulic supply into the hydraulic blocking cylinder is less than into the hydraulic actuating cylinder.

5. The park lock actuation system according to claim 3, wherein the hydraulic blocking cylinder has a longitudinally displaceable auxiliary piston, wherein the radial movement of the blocking element into its blocking position is coupled to longitudinal displacement of the longitudinally displaceable auxiliary piston, or the hydraulic actuating cylinder has a longitudinally displaceable main piston, wherein longitudinal displacement of the actuating element is coupled to longitudinal displacement of the longitudinally displaceable main piston.

6. The park lock actuation system according to claim 5, wherein the blocking element and the longitudinally displaceable auxiliary piston have corresponding surfaces which interact with one another in such a way that the blocking element is displaced in the radial direction when the longitudinally displaceable auxiliary piston is displaced longitudinally.

7. The park lock actuation system according to claim 5, wherein a third restoring element, by a restoring force of which the longitudinally displaceable auxiliary piston can be translated in the longitudinal direction to deflect the blocking element.

8. The park lock actuation system according to claim 5, wherein the longitudinally displaceable auxiliary piston is designed as an annular piston arranged axially inside the longitudinally displaceable main piston.

9. A park lock actuation system for a motor vehicle, comprising:
an actuating element, translatable by hydraulic actuation, from a locking position, in which a park lock coupled with the actuating element is active, to an unlocking position, in which the park lock is inactive, when a first hydraulic pressure value is exceeded, the actuating element comprising a longitudinal axis defining a longitudinal direction;
a blocking element, formed as a transverse slide, movable, in a radial direction normal to the longitudinal axis, by hydraulic actuation, from an unblocking position, in which the actuating element is translatable between the locking position and the unlocking position, to a blocking position, in which the blocking element fixes the actuating element in the unlocking position in a form-fitting manner, when a second pressure value, higher than the first hydraulic pressure value, is exceeded;
a hydraulic actuating cylinder for actuating the actuating element; and
a hydraulic blocking cylinder for actuating the blocking element, wherein:
the hydraulic blocking cylinder comprises an auxiliary piston that is displaceable in the longitudinal direction;
the hydraulic actuating cylinder comprises a main piston that is displaceable in the longitudinal direction; and
the auxiliary piston is an annular piston arranged axially inside of the main piston.

10. The park lock actuation system of claim 9 further comprising:
a first restoring element arranged to provide a first restoring force for translating the actuating element in the longitudinal direction; and
a second restoring element arranged to provide a second restoring force for moving the blocking element in the radial direction, wherein the first restoring force generates a frictional force between the actuating element and the blocking element, greater than the second restoring force, when the blocking element is in the blocking position.

11. The park lock actuation system of claim 10, wherein, when a hydraulic pressure acting on the hydraulic actuating cylinder and the hydraulic blocking cylinder is reduced from the second pressure value, the blocking element is held in the blocking position until the frictional force acts on the blocking element.

12. The park lock actuation system of claim 11, wherein:
the hydraulic blocking cylinder and the hydraulic actuating cylinder share a common hydraulic supply; and
a volume flow of the common hydraulic supply into the hydraulic blocking cylinder is less than a volume flow of the common hydraulic supply into the hydraulic actuating cylinder.

13. The park lock actuation system of claim 12, wherein the hydraulic blocking cylinder is hydraulically connected to the hydraulic actuating cylinder via an orifice.

14. The park lock actuation system of claim 11 wherein:
displacement of the blocking element in the radial direction into its blocking position is coupled to displacement of the auxiliary piston in the longitudinal direction; or
displacement of the actuating element in the longitudinal direction is coupled to displacement of the main piston in the longitudinal direction.

15. The park lock actuation system of claim 14, wherein the blocking element and the auxiliary piston have corresponding surfaces that displace the blocking element in the radial direction when the auxiliary piston is displaced in the longitudinal direction.

16. The park lock actuation system of claim 15 further comprising a third restoring element arranged to provide a third restoring a force for translating the auxiliary piston in the longitudinal direction to deflect the blocking element.

* * * * *